US005590805A

United States Patent [19]
Knoss et al.

[11] Patent Number: 5,590,805
[45] Date of Patent: Jan. 7, 1997

[54] FRUIT BOX

[75] Inventors: Robert Knoss, Anoka; Calvin S. Krupa, Hamel, both of Minn.

[73] Assignee: Ultra Pac, Inc., Rogers, Minn.

[21] Appl. No.: 193,433

[22] Filed: Feb. 8, 1994

[51] Int. Cl.⁶ .................................................... B65D 45/00
[52] U.S. Cl. .................. 220/508; 206/521.8; 206/521.9; 220/639
[58] Field of Search .................................. 206/508, 509, 206/521.8, 521.9; 220/508, 639; 229/2.5

[56] References Cited

U.S. PATENT DOCUMENTS

| Re. 25,094 | 12/1961 | Flynn . |
| D. 197,990 | 4/1964 | Weiss . |
| D. 197,992 | 4/1964 | Weiss . |
| D. 221,134 | 7/1971 | Bessett . |
| 586,846 | 7/1897 | Hammer . |
| 1,445,780 | 2/1923 | Mann et al. . |
| 1,803,128 | 4/1931 | Oxhandler . |
| 1,843,543 | 2/1932 | DeReamer . |
| 3,000,528 | 9/1961 | Kuhl et al. . |
| 3,049,259 | 8/1962 | Mazzi et al. . |
| 3,128,933 | 4/1964 | Hohnjec . |
| 3,143,237 | 8/1964 | Weiss . |
| 3,145,870 | 8/1964 | Lockwood . |
| 3,398,875 | 8/1968 | Snow et al. . |
| 3,572,578 | 3/1971 | Koltoin .......................... 206/521.8 |
| 3,643,857 | 2/1972 | Noguchi ......................... 206/521.8 |
| 3,695,479 | 10/1972 | Crabtree . |
| 3,920,178 | 11/1975 | Miller ............................ 206/521.8 |
| 3,933,295 | 1/1976 | Congleton . |
| 4,173,286 | 11/1979 | Stanko . |
| 4,195,746 | 4/1980 | Cottrell . |
| 4,757,899 | 7/1988 | Magnussen, Jr. et al. . |
| 4,838,444 | 6/1989 | Bitel . |

*Primary Examiner*—Joseph M. Moy
*Attorney, Agent, or Firm*—Haugen and Nikolai, P.A.

[57] ABSTRACT

A rigid, sturdy, two-piece reusable container forming individual cups to contain fruit or other perishables. The device includes a brace that provides support, rigidity, separates the cups of different containers and forms a relatively flat surface. It also includes ribs that provide further support. The device further includes support members that provide a spacing means for ventilation. The device also includes locking members that hold the cover and the base together. The device also contains individual cups with corrugations that further prevent bruises and spoilage of the fruit.

18 Claims, 6 Drawing Sheets

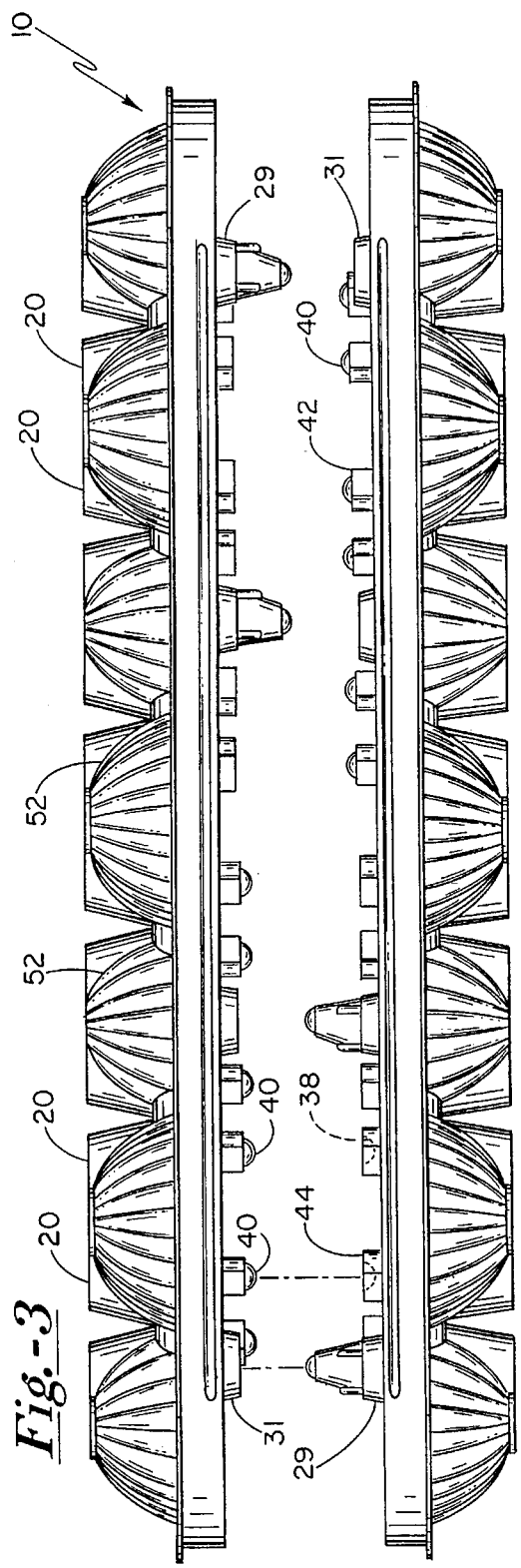
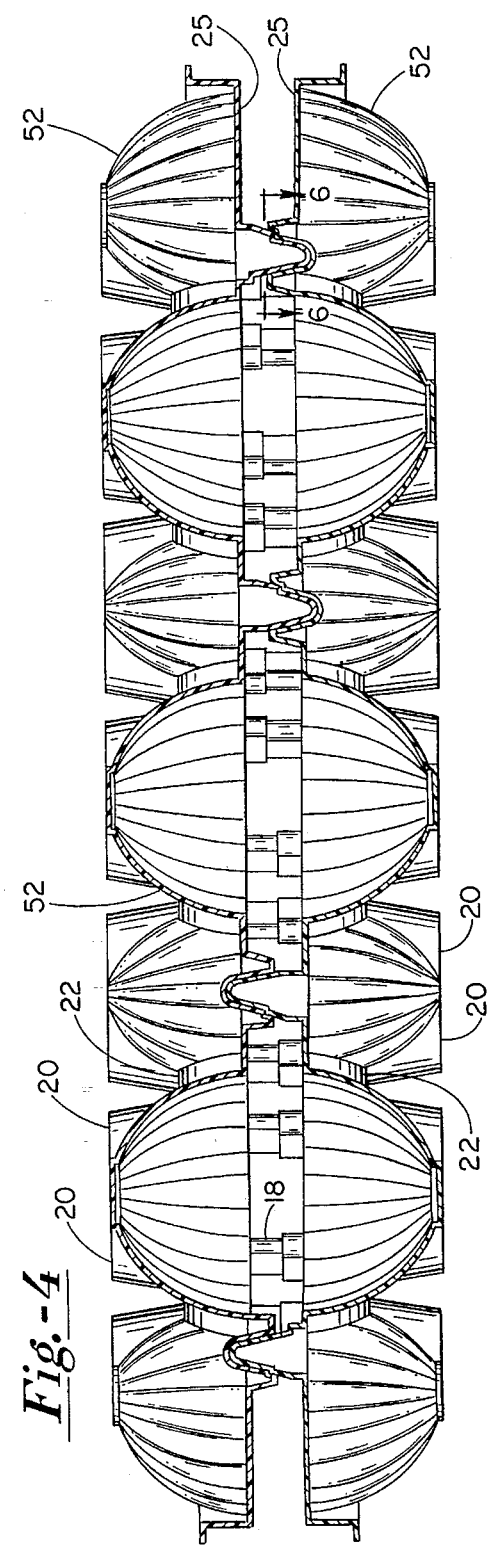
Fig.-3
Fig.-4

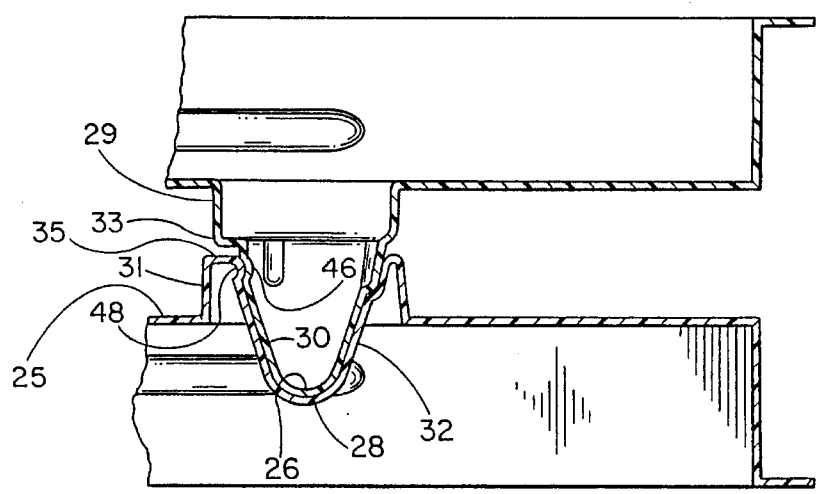
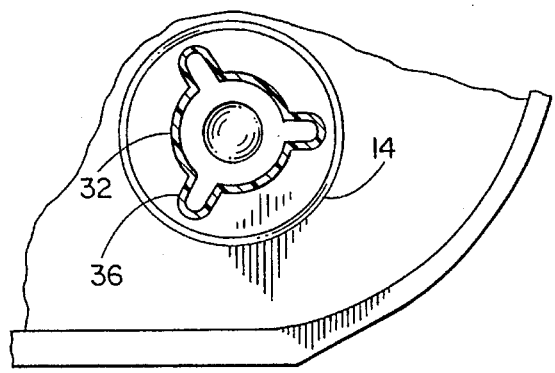
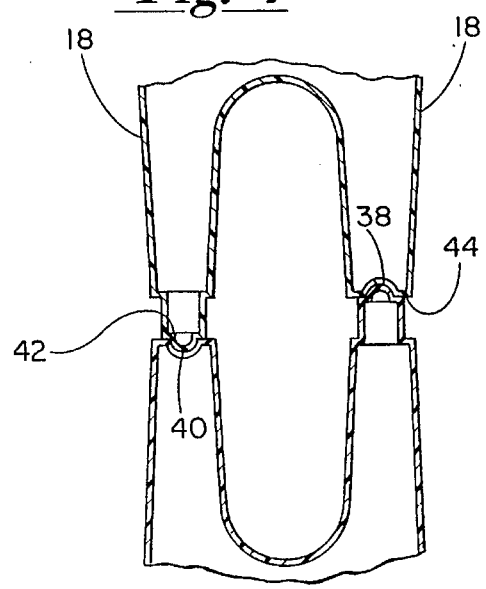

Fig.-8
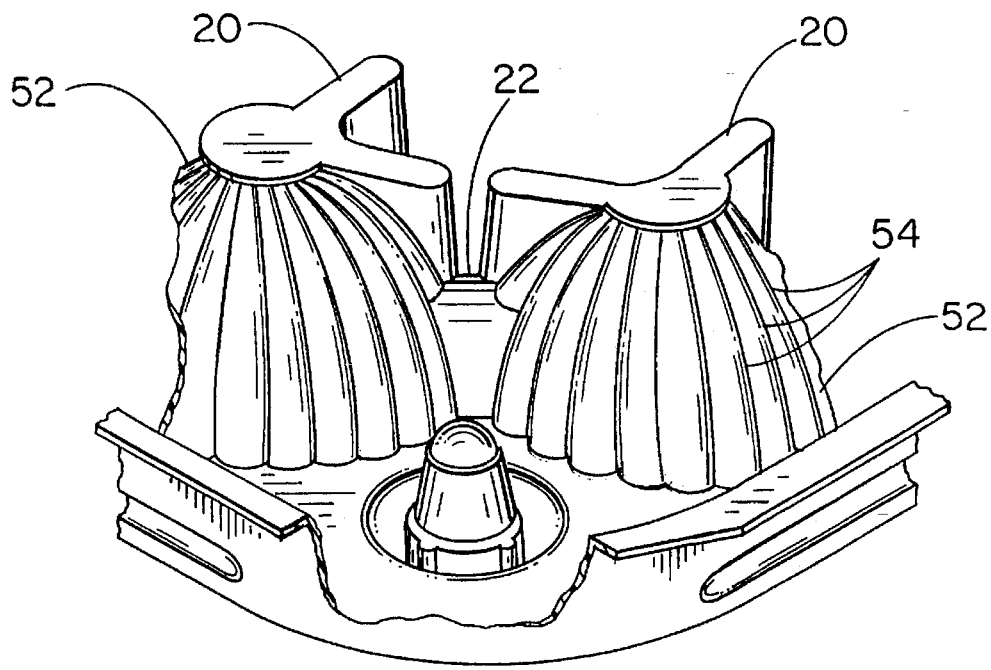
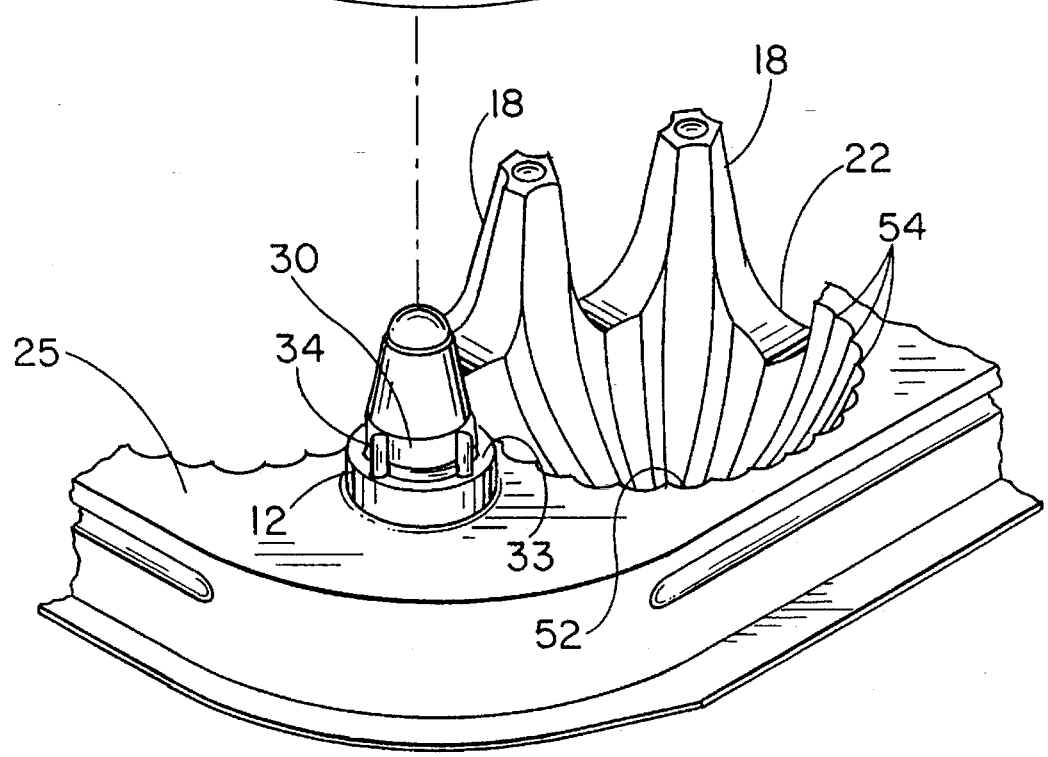

FRUIT BOX

BACKGROUND OF THE INVENTION

I. Field of the Invention

This invention relates generally to a fruit container and more particularly to a reusable interlocking two-piece fruit box with individual cups that allow for ventilation, serving as a protective package.

II. Discussion of Prior Art

Fruit containers are now commonly used by distributors and retailers of fresh fruit. In the past there have been containers with a protective means to reduce the amount of damage to the fruit. Such containers generally are made from a flat polymer sheet having recesses to individually contain pieces of fruit or other perishables. These containers often have a nesting tray so that two of them can be assembled together to provide both the base and also the cover for an integrated container like assembly such as in U.S. Pat. No. 4,838,444. The disadvantage of these containers is they do not allow ample ventilation.

Other various containers often have a plurality of recesses in the tray members such as in U.S. Pat. No. 3,695,479. The greatest disadvantage of this type of container is that the recesses formed to hold the fruit are in direct contact with more than one piece of fruit. The present invention overcomes these disadvantages by providing a relatively inexpensive, reusable, sturdy, cupped tray with a brace that keeps the individual cups from contacting other cups when stacked, and a rib that separates the cups within the tray. The present invention also has pillar forming supports that allow for ample ventilation to all of the cups within the formed box.

SUMMARY OF THE INVENTION

The purpose of the present invention is to provide a reusable ventilated, interchangeable fruit tray with cups. One tray can be inverted and aligned with another tray, forming an integrated container-like assembly with a cover and base. Further, the empty trays may be nested together. In the preferred embodiment, the tray is formed in a mold from a flat polymer sheet. The cover and base are identical requiring only one mold. The tray has a plurality of corrugated cups with bracing at the peak of each cup. The braces extend perpendicularly outward from the cup and may have varying heights. The highest braces in combination form a relatively flat surface allowing the tray to lie flat. The cups with the highest braces have notches extending inward from the braces. Posts extend perpendicularly outward from the shorter braces to the same height as the highest braces. When one integrated container is stacked on top of the other, the posts and notches are symmetrically positioned whereby, the posts and notches engage preventing the integrated containers from slipping off each other. The outer edge of the tray has a lip that provides rigidity to the package. The tray also has ribs extending from each cup to provide support and separates each cup.

For reference purposes the tray is figuratively divided into two halves along the width axis. On one half (the left half), a plurality of male locking means extend from the tray lip. On the other half (the right half), a plurality of female locking means extend from the tray lip. The male and female locking means align and lock in place, providing a rigid container. The tray also has a plurality of male and female support members that align and engage when one tray is inverted and placed on top of the other. These support members act as spacers between the cover and base allowing continuous ventilation.

When used, a fruit box may be assembled from identical trays. The trays are aligned side by side with the locking and support members positioned symmetrically in relation to each other. One tray is then inverted so that the female locking means engage with the male locking means. The support members extend above the lip surface of the tray providing a gap for ample ventilation when the cover and base are assembled. The cover and base may be pulled apart, allowing the contents of the container to be removed. The cover and base may be used again. One fruit box may be stacked on top of another, engaging the notches and posts, preventing the fruit boxes from slipping off each other. When not in use, the empty trays may be nested together, requiring less space to store the trays.

Accordingly, the principal object of the present invention is to provide an improved device for containing fruit during transport, storage, and display.

Another object of the present invention is to provide an aesthetically pleasing container for fruit or other perishables.

Still another object of the present invention is to provide a reusable fruit box formed by an identical cover and base, so that only one mold is required to produce the cover and base.

Another object of the present invention is to provide a fruit box with interlocking cover and base.

Yet another object of the present invention is to provide support pillars between the cover and base to allow ample ventilation.

Another object of the present invention is to keep the plurality of cups from contacting each other when the containers are stacked.

Another object of the present invention is to provide a sturdy, semi-rigid, stackable cover and base.

Another object of the present invention is to provide a means to prevent containers, when stacked, from slipping off each other.

A further object of the present invention is to provide corrugated cups that reduce the amount of fruit rotation during transport.

These and other objects of the present invention will be readily apparent from a review of the following detailed description of the preferred embodiment in conjunction with the accompanying drawings and claims.

BRIEF DESCRIPTION OF THE DRAWINGS

FIG. 3 is a partial side elevational view of a cover and base of the type shown in FIG. 1 being aligned with the cover in an elevated position displaced from the base.

FIG. 4 is a partial sectional side elevational view of a cover and base of the type shown in FIG. 1 with the locking members engaged.

FIG. 5 is a partial cross-sectional view of the locking members through line 5—5 of FIG. 2.

FIG. 6 is a partial cross-sectional view through line 6—6 of FIG. 4.

FIG. 7 is a partial cross-sectional side elevational view of the support members.

FIG. 8 is a partial sectional perspective view, broken away, of the cover and base of the type shown in FIG. 1 with locking members aligned and with the cover displaced from the base completely in an elevated position.

DETAILED DESCRIPTION OF THE PREFERRED EMBODIMENT

Figure 1:
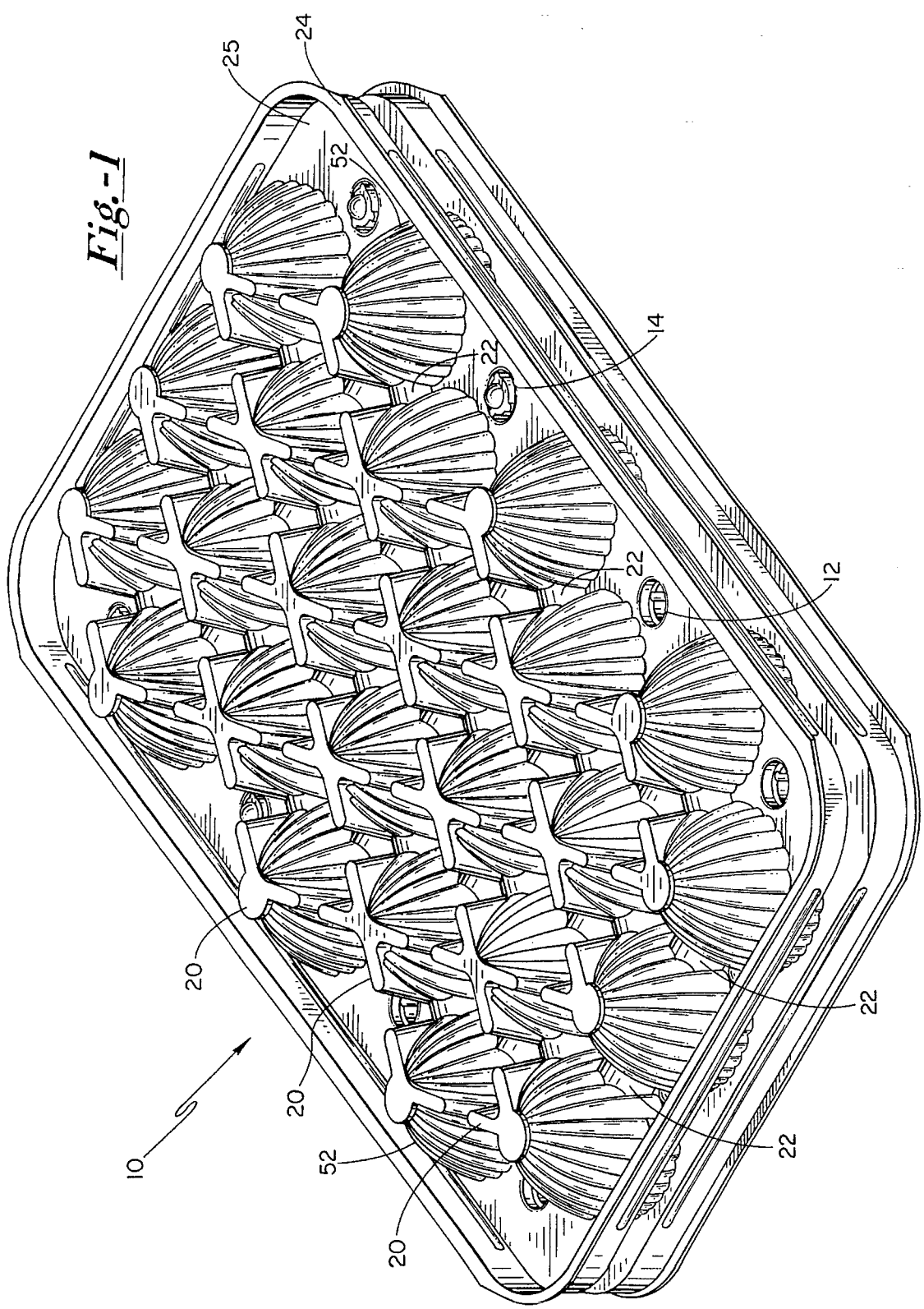
FIG. 1 is a perspective view of an engaged cover and base.
Figure 2:
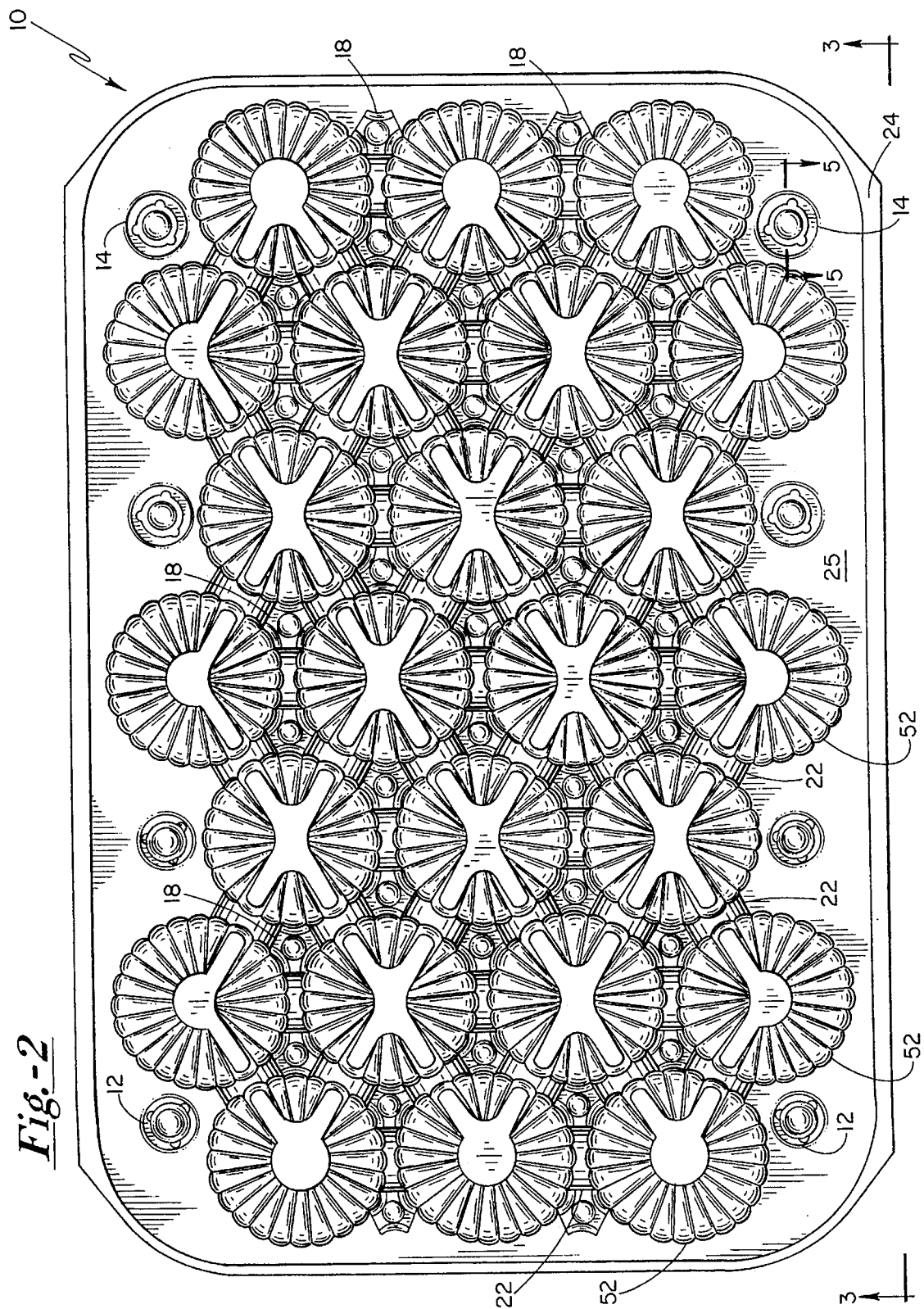
FIG. 2 is a partial bottom view of a cover or base.

FIG. 2 shows a partial bottom view of the cover or base 10 of the present invention. As shown in the drawings, the cover or base 10 is comprised of an outer edge 24, a lip surface 25 and a plurality of: cups 52, ribs 22, supports 18, male locking members 12, and female locking members 14. The horizontal surface of the cover or base 10 is defined by the lip surface 25. The lip surface 25 and outer edge 24 provide rigidity to the cover or base 10.

The cups 52 extend outwardly from the lip surface 25. Each cup forms an individual container to hold fruit or other perishables. Within each cup 52 are corrugations or grooves 54 that extend inward into the cup (See FIGS. 4 and 8). These corrugations help reduce the amount of fruit rotation during transport. They also provide support to the cup 52 so that the cup holds its shape.

Figure 9:
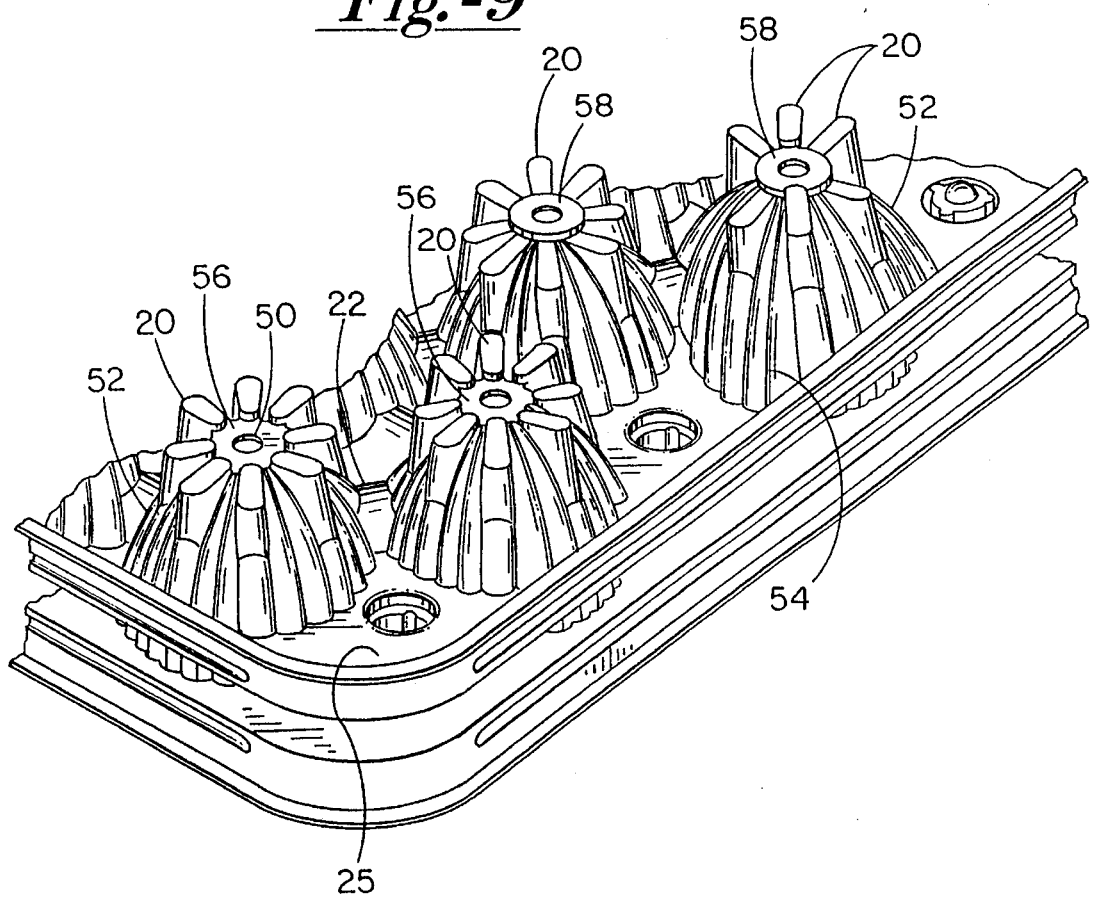
FIG. 9 is a partial perspective view broken away, of a cover and base of the type shown in FIG. 1, with an alternative brace structure including notches and posts.

The cups may be manufactured with a smooth surface rather than with corrugations. Associated with each cup are braces 20 that provide further support and rigidity (see FIGS. 1, 3, 4 and 8). The braces 20 may have varying heights. The highest braces have notches 56 extending inward from the braces. The shorter braces have posts 58 extending outward to the same height as the highest braces, (see FIG. 9). The posts 58 and notches 56 are symmetrically positioned so that the posts 58 will engage with the notches 56 of stacked fruit boxes. The highest braces 20 also serve to provide flat horizontal top and bottom surfaces which permit the containers to be stacked. At the peak of each cup, an aperture 50 could be added to extend perpendicularly through the brace providing drainage and additional ventilation (see FIG. 9). The trays may be manufactured with varying combinations of brace shapes and heights.

In the preferred embodiment, there are two dozen cups whose general structure is similar to a paraboloid where the peak in the cup corresponds to the vertex of the paraboloid. Other general structures of the embodiment could be similar to an ellipsoid, a hyperbaloid, a half sphere or other semi round geometric figures. The number of cups and geometric structure of each cup may be changed, of course, without deviating from the present invention. Likewise, while in the preferred embodiment the cover and base are molded from a thin sheet of polycarbonate resin, other suitable materials can, of course, be used without deviating from the present invention.

Between each adjacent cup 52, a rib 22 is formed which provides added support and further separates each cup 52. These ribs 22 extend downward in a U shape from the lip surface 25 to approximately half the depth of the cup 52, creating a gap between adjacent cups enhancing continuous ventilation to each cup 52. (See FIGS. 4, 7 and 8.)

The ribs 22, in combination with the adjacent cups 52, form a six-sided support pillar 18 (See FIGS. 7 and 8) that extends from the lip surface 25 of the cover or base. For reference purposes, the cover or base length is divided into two equal halves. A convex dome 40 and support pillar edge 42 form the top of each support pillar 18 in the right half. A concave recess 38 and female support pillar edge 44 form the top of each support pillar 18 in the left half (See FIG. 3). When the cover and base are aligned and pressed together, the concave recess 38 and female support pillar edge 44 engage with the convex dome 40 and the male support pillar edge 42 respectively. When the cover support pillars and the base support pillars are engaged, they provide support and the pillars 18 act as a spacer between the cover and base providing ample ventilation to all cups within the container. (See FIGS. 4 and 7.)

Extending from the lip surface 25 of the right half of the cover or base 10 are a plurality of cylindrical female pillars 31. Extending from the left half of the cover or base are a plurality of cylindrical male pillars 29 (See FIG. 3). Referring to FIG. 5, the female pillar engaging edge 35 forms the top of each female pillar 31. The male pillar engaging edge 33 forms the top of each male pillar 29. Recessed within each female pillar engaging edge 35 is the conical female locking tapered inner surface 32. Extending upward from each male pillar engaging edge 33 is the conical male locking tapered shoulder 30. The peak of the female locking member 14 is formed by the female locking member concave dome 28. The male locking member convex dome 26 forms the peak of each male locking member 12 (See FIG. 5). When engaged, the female locking member 14 and male locking member 12 snap together, securely holding the cover and base together and providing rigidity to the container.

Extending from each male pillar engaging edge 33 and extending perpendicularly from the male locking member tapered shoulder 30 are three fins 34 symmetrically spaced around the circumference of the tapered shoulder 30 and extending one-third of the way up the taper (See FIG. 8). The fins 34 help guide the male locking member 12 into female locking member 14. Recessed within the female locking member tapered inner surface 32 are three notches 36 extending one-third of the way down the tapers symmetrically spaced and aligned to receive the male locking member fins 34 (See FIG. 6). At the intersection of each male pillar engaging edge 33 and the male tapered shoulder 30 is a concave groove 46 that extends parallel to the engaging edge 33 around the circumference of the male tapered shoulders 30. The concave groove 46 width is approximately one-fifth the total height of the male locking member 12. At the intersection of each female pillar engaging edge 35 and the female tapered shoulder 32 is a convex rib 48 that mirrors the concave groove 46. The convex rib 48 extends inward and upward from the female locking tapered inner surface 32 to the female pillar engaging edge 35, parallel to the engaging edge 35 around the circumference of the female tapered shoulder 32 (See FIG. 5). The circumference of the convex rib 48, measured at the center of rib 48, is slightly larger than the circumference of the male locking tapered shoulder 30 (measured at the point when traveling down the concave groove from the engaging edge 33 where the groove intersects with the male locking tapered shoulder 30). This difference in circumferences acts as the locking mechanism. When a force is applied to the cover and base the male and female locking members snap into position.

Operation of the present invention will now be discussed with a base 10 sitting on a flat surface with the highest braces 20 in full contact with this flat surface, the operator then places fruit or other perishables into the individual cups 52. Another base is set on the surface with highest braces 20 in full contact with the flat surface. The lengths and widths of the two bases are parallelly aligned. One base is inverted around the width axis, becoming the cover for the two-piece container. The operator then aligns the cover above the base so that the plurality of female locking members 14 are in complete alignment with the male locking members 12. The operator then applies an even downward perpendicular force on the cover 10 until all of the female and male locking members snap into place. (See FIG. 1).

The operator may continue to form other containers in the same manner. These containers may then be stacked, with the posts 58 aligned and engaged with the notches 56. The ribs 22, bracing 20 and support pillars 18 support the additional weight of stacked containers. The posts 58 and notches 56 are symetrically positioned so that the posts and notches of stacked containers engage, preventing the containers from slipping off each other. The support pillars 18 also separate the cover and base 10 allowing a continuous and ample ventilation to all cups 52. The aperture 50 extending through the bracing 20 provides drainage for any possible moisture that may build up within each cup, thereby further reducing the likelihood of spoilage.

To separate the base and cover, the operator applies a perpendicular force against the cover in the direction opposite the base and an equal perpendicular force against the base in a direction opposite the cover. These forces separate the female locking member 14 and the male locking member 12 allowing the cover 10 to be removed. Once the cover is removed, the fruit may be removed or additional fruit may be added to any empty cups 52. Once all the fruit is removed, the cover may be inverted to form a base and then nested on top of other bases.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A stackable package for fruit or other perishables, said package including a cover member and a base member, each such member comprising:

(a) an outer edge extending around a perimeter of said member to provide rigidity to said member;

(b) a lip surface defining the horizontal surface of said member with a width and length axis in the center of said lip surface;

(c) a plurality of cups symmetrically positioned from said lip surface center and extending from said lip surface;

(d) a plurality of supports extending upward above said lip surface between each adjacent cup to provide a gap between said cover member and said base member when said cover member is secured to said base member; and (e) a plurality of male and female locking means extending from the lip surface symmetrically positioned around the perimeter of said plurality of cups, said male and female locking means being positioned so that said cover member and said base member can be secured together by the male locking means of said cover member engaging the female locking means of said base member and the female locking means of said cover member engaging the male locking means of said base member.

2. A device as recited in claim 1 in which said cups further comprise a brace extending downward from a bottom of each said cup to provide support, rigidity and, in combination, create a second relatively flat horizontal surface.

3. A device as recited in claim 2 in which some of said braces further comprise a positioning means for positioning stacked packages, extending from said braces.

4. A device as recited in claim 3 in which said positioning means further comprises posts extending perpendicularly outward from some of said braces, and some of said braces further comprise notches extending inward from said braces so that when said base member is stacked on said cover member, said posts on said base member engage said notches on said cover member and said notches on said base member engage said posts on said cover member.

5. A device as recited in claim 3 in which said cups further comprise corrugations formed in said cups.

6. A device as recited in claim 1 further comprising a plurality of ribs extending downward from said lip surface and connecting said adjacent cups, thereby separating said cups.

7. A device as recited in claim 1 in which some of said plurality of supports further comprise a support pillar edge extending perpendicularly inward from said support pillar and a convex dome extending upward from said support pillar edge, and other of said plurality of supports further comprise a support pillar edge extending perpendicularly inward from said support pillar and a concave recess extending inward and down from said support pillar edge so that when said cover member is secured to said base member, the said concave recesses on said base member engage said convex domes on said cover member and said convex domes on the base member engage the concave recesses on said cover member.

8. A device as recited in claim 1 in which said female locking means further comprise a cylindrical pillar extending from said lip surface, an engaging edge extending perpendicularly inward from said cylindrical pillar, a conical tapered shoulder extending downward and tapering from said engaging edge, and a convex dome extending down from said conical tapered shoulder forming the peak of each said female locking means.

9. A device as recited in claim 1 in which said male locking means further comprise a cylindrical pillar extending from said lip surface, an engaging edge extending perpendicularly inward from said cylindrical pillar, a conical tapered shoulder extending upward and tapering from said engaging edge, and a convex dome extending upward from said conical tapered shoulder forming the peak of each male locking means.

10. A device as recited in claim 8 in which said conical tapered shoulder further comprises three notches symmetrically spaced around the circumference of said tapered shoulder extending down from said engaging edge, perpendicular to said conical tapered shoulder one-third of the way down said conical tapered shoulder.

11. A device as recited in claim 9 in which said conical tapered shoulder further comprises three fins symmetrically spaced around the circumference of said tapered shoulder extending upward from said engaging edge, perpendicular to said conical tapered shoulder one-third of the way up said conical tapered shoulder.

12. A device as recited in claim 9 in which said conical tapered shoulder further comprises a concave groove extending around the circumference of said conical tapered shoulder, where said groove is parallel and adjacent to said pillar engaging edge.

13. A device as recited in claim 8 in which said conical tapered shoulder further comprises a convex rib extending around the circumference of said conical tapered shoulder, where said rib is parallel and adjacent to said engaging edge.

14. A device as recited in claim 1 in which said braces further comprise an aperture centered at the apex of each said cup and extending through said brace to provide means for drainage.

15. A stackable package for fruit or other perishables, said package including a cover member and a base member, each such member comprising:

(a) an outer edge extending around a perimeter of said member to provide rigidity to said member;

(b) a lip surface defining the horizontal surface of said member with a width and length axis in the center of said lip surface;

(c) a plurality of cups symmetrically positioned from said lip surface center and extending from said lip surface separated by a plurality of ribs extending downward from said lip surface and connecting adjacent cups and thereby separating said cups, said cups including a brace extending downward from a bottom of each said cup to provide support, rigidity and, in combination, create a second relatively flat horizontal surface;

(d) a plurality of supports extending upward above said lip surface between each adjacent cup to provide a gap between said cover member and said base member when said cover member is secured to said base member; and (e) a plurality of male and female locking means extending from the lip surface symmetrically positioned around the perimeter of said plurality of cups, said male and female locking means being positioned so that said cover member and said base member can be secured together by the male locking means of said cover member engaging the female locking means of said base member and the female locking means of said cover member engaging the male locking means of said base member.

16. A device as recited in claim 15 in which at least one of said braces further comprise a positioning means for positioning stacked packages, extending from said braces.

17. A device as recited in claim 16 in which said positioning means further comprises posts extending perpendicularly outward from some of said braces, and some of said braces further comprise notches extending inward from said braces so that when said base member is stacked on said cover member, said posts on said base member engage said notches on said cover member and said notches on said base member engage said posts on said cover member.

18. A device as recited in claim 15 in which said cups further comprise corrugations formed in said cups.

* * * * *